(12) United States Patent
Cheah et al.

(10) Patent No.: US 7,518,896 B2
(45) Date of Patent: Apr. 14, 2009

(54) PHASE CONTROL SYSTEM FOR SWITCHING POWER SUPPLY PRE-REGULATOR ALLOWS INCREASED POWER TRANSFORMER LEAKAGE INDUCTANCE

(75) Inventors: Chin Hong Cheah, Penang (MY); Lian Ping Teoh, Penang (MY); Beng Wei Keng, Penang (MY)

(73) Assignee: Agilent Technologies, Inc., Santa Clara, CA (US)

( * ) Notice: Subject to any disclaimer, the term of this patent is extended or adjusted under 35 U.S.C. 154(b) by 325 days.

(21) Appl. No.: 11/560,108

(22) Filed: Nov. 15, 2006

(65) Prior Publication Data

US 2008/0112198 A1 May 15, 2008

(51) Int. Cl.
*H02M 7/217* (2006.01)
(52) U.S. Cl. .................................... 363/89; 323/266
(58) Field of Classification Search .............. 323/26, 323/268, 282, 288; 363/15, 16, 89
See application file for complete search history.

(56) References Cited

U.S. PATENT DOCUMENTS

| | | | | |
|---|---|---|---|---|
| 4,893,228 A | * | 1/1990 | Orrick et al. | 363/98 |
| 4,974,141 A | * | 11/1990 | Severinsky et al. | 363/81 |
| 5,132,606 A | * | 7/1992 | Herbert | 323/266 |
| 5,272,613 A | * | 12/1993 | Buthker | 363/21.1 |
| 5,357,418 A | * | 10/1994 | Clavel | 363/89 |
| 6,169,391 B1 | * | 1/2001 | Lei | 323/266 |

* cited by examiner

*Primary Examiner*—Jeffrey L Sterrett
(74) *Attorney, Agent, or Firm*—Marc Bobys (57) ABSTRACT

A switching pre-regulator for a bulk capacitor filter followed by a series pass regulator has a switching element controller that relies upon a large desirable leakage inductance in a main secondary winding of a power transformer acting as a swinging choke input to the bulk capacitive filter. This desirable leakage inductance limits inrush current and supplies some filtering. However, the effective value of the swinging choke is a function of load conditions, and introduces a varying phase shift that would potentially disturb the zero crossing detection used in properly activating the switching element. In addition to creating a reference ramp synchronized to the phase shifted, twice power line frequency, full wave rectified zero crossings of the principal current supplying secondary winding, the switching element controller receives a selectable one of an isolated indication of primary line voltage zero crossings or zero crossing indications for an un-rectified auxiliary secondary winding that has a separate leakage inductance that mimics the effect of the phase shift experienced with the main secondary winding. This gives the switching controller the ability to know true zero crossings. The controller for the switching element can now adjust the conduction of that switching element to turn off at a zero crossing, which reduces both acoustic noise from the power transformer and in-circuit electrical noise by eliminating a steep falling edge in the switched current pulse used to supply the bulk capacitive filter.

4 Claims, 6 Drawing Sheets

PHASE CONTROL SYSTEM FOR SWITCHING POWER SUPPLY PRE-REGULATOR ALLOWS INCREASED POWER TRANSFORMER LEAKAGE INDUCTANCE

INTRODUCTION AND BACKGROUND

The term "power supply" typically refers to a circuit that converts the electrical utility's AC mains to a DC voltage of selected and regulated value for use by some circuit or mechanism. A bench power supply is generally considered to be an item of electronic test equipment that replaces (temporarily) a built-in power supply for some product or apparatus under development. While a bench power supply might be considered a thing of a more general nature than a built-in power supply, in that it might be expected to operate under quite varied and possibly extreme conditions, the design of any power supply that is capable of supplying high currents raises certain issues common to power supplies in general. For example, the limiting of inrush current for certain vulnerable components within the power supply, such as the rectifier (often a full wave bridge) and the bulk filter capacitance ahead of a series pass regulator, is often a concern, as those components can undergo catastrophic failure under over-current conditions. Such over-current conditions can occur for initial turn on or for rectified cycle by cycle maintenance of a heavy load, and are always items of interest for the designer of the power supply. Another area of concern is noise. Quite aside from any necessary fans for cooling, the hum caused by the power transformer that (for a low voltage power supply) steps the AC mains down to a lower voltage often produces an audible hum that becomes more pronounced as the load on the supply increases.

While various things might be done to reduce the amount of hum, there is one trend in modern power supply design that, in the name of efficiency (always a good thing) can make a mere hum into an aggravating noise: switching elements in a power supply can cause large excursions in current that don't necessarily begin or end at a zero crossing and that can have very abrupt starts and stops. Since the power supplied by the power supply is at one point a magnetic force within the power transformer, its mechanical nature must 'anchor' (conduct while containing) the magnetic forces involved (or at least resist mechanical deformation or movement under their influence) to efficiently transform one AC voltage and current to another. Loose laminations within the magnetic core of the power transformer, and limitations on how tightly windings can be affixed thereto, provide the causes for the familiar hum at the power line frequency. These same mechanical conditions can turn that hum into more of a howl under the stimulation of the large and abrupt variations in current required by some switching techniques. This acoustic 'switching noise' noise from a switching power supply can sometimes be very objectionable. Abrupt variations in switched non-sinusoidal currents can also cause undesirable electrical noise in nearby components or circuits.

One technique that has been used to both provide filtering and a limit on inrush current is an initial series inductance in the path of the current. When provided as a separate individual component this is known as a 'choke input' filter. It can store power as a magnetic field in its winding and contribute a sustaining EMF (Electro Motive Force) and an associated current as a rectified cycle loses amplitude. It is not that this does not work, but the additional separate inductor is heavy, takes space, is expensive, adds its own acoustic noise, and is generally more effective as the load increases. All in all, it is no longer a first choice in many applications. There is, however, a close relative that can be used to advantage to limit inrush current: 'leakage inductance' within the power transformer itself.

Leakage inductance is not something that has oozed out a an inductor that is leaky, and that is lost in a puddle somewhere. It is real inductance that a transformer winding exhibits, according to the extent that the transformer fails in a certain way to behave as an ideal transformer. Consider identical primary and secondary windings on a perfect magnetic core having no losses and equally responsive to all of the magnetic flux created by each winding, and let each winding be completely coupled to all of the flux in the core. Let's operate this arrangement at low frequencies that pose no RF (Radio Frequency) related issues. Under these circumstances we have an ideal 1:1 transformer. We put 120 VAC at 60 Hz in and we expect (and do) get 120 VAC out. In fact, (and ignoring such artifacts as phase inversion) so long as we don't ask it to supply too much power to a load, we are hard pressed to tell by looking at the output voltage that it is coming from a transformer. There will, of course, come a point (for a non-ideal transformer) with increasing load that causes saturation in the core, and that behavior will probably betray the source as being a transformer.

That thought leads to another: How is it that this 1:1 transformer 'knows' to cause in its secondary winding a voltage that will produce the same current that is entering and leaving the primary winding? Worse still, suppose it was 5:1? And perhaps worst of all, how is it that the current in the primary falls to (very nearly) zero when the load is disconnected from the secondary? Just what is it that makes a transformer with no moving parts, and no on-board microprocessor, so smart?

The answer, and it has been known for a long time, is that transformer action is dependent upon a balance and counter balance of intervening effects that exactly cancel each other. The varying magnetic field of the primary induces a current in the secondary that in turn produces its own magnetic field that is then experienced by the primary. The two magnetic fields do not annihilate each other (or we'd have no transformer . . . ) but they do remove from each winding what it would, it were the only winding on the core, see as (self) inductance. So, each winding and its current has, courtesy of the other winding and the other current, 'no' inductive reactance to limit its current flow at the frequency of the applied EMF. The current in the secondary is limited by some (let us say resistive) external load. That sets the amount of flux that the secondary has available to influence the primary, and that limited influence allows the current in the primary to rise to the level needed to create the balance. The balance is, within limits, stable, and we call this machine with 'no moving parts' a transformer. If the load on the secondary is removed, there is no current in the secondary, and it creates no flux to influence the primary winding, whose current is then limited by just the 'magnetizing inductance' available in the primary, which might be considerable. The primary current is then very low, owing to an apparent inductive reactance of the primary.

This happy state of affairs relies on the idea that all of the lines of magnetic flux created by the primary are 'consumed by' (coupled to) the primary, and vice versa. Now suppose that, either because we treat certain secondary windings a certain way, or because of less than ideal magnetic coupling of each winding to the core (and mindful that magnetic coupling is 'two way,' or from both 'from' and 'to'), some magnetic flux is not coupled from one winding to the other. Suppose it 'leaks' out of the core and then 'back in' without having intersected the other (primary) winding. (Or suppose some flux from a winding never enters the core and thus does not enter the other winding.) That magnetic flux from the one winding that 'leaked out' to not couple to the other is free to make inductive reactance in that first winding, since it does not participate in the balancing action for transformer operation described above. We have leakage flux giving rise to self induction. It is what we call leakage inductance. If we were to go back to our claim that one could not tell that there was a one to one transformer in a certain set-up, we now must admit that if it had any significant leakage inductance we could spot it as readily as we could the presence of a series inductor separate from the transformer. That is, we could detect a phase shift between the voltage at the terminals of the secondary winding and the current that it supplies.

This is not necessarily a bad thing, and the presence of leakage inductance in power transformers has successfully been used to replace a separate filter inductor in the input to the balance of the power supply. The right amount of such inductance can do good things besides mere filtering, such as improve the power factor that the whole power supply presents to the AC mains, and significantly reduce inrush currents.

However, where there is inductive reactance, there is apt to be some phase shift, and in this case it will increase with increasing current. (Think of a fixed L driven by an AC source and in series with a decreasing R to ground. As the R decreases the phase shift between the applied EMF and the drop across that resistor increases until it reaches 90° when R=0 and the current is limited solely by the reactance of the L.)

Switching power supplies do what they do using an appreciation of zero crossings in applied AC voltages. Significant phase shift ahead of a zero crossing detector in a switching power supply is by itself an unwelcome development, and has in the past been the subject of amelioration through a fixed amount of compensation. That has sometimes been an agreeable solution, but in high current conventional switching power supply applications the whole notion of leakage inductance as a useful current limiting device comes unstuck. The amount of leaking inductance is not constant, but is a non linear function of current, and the thus unpredictable phase shift that accompanies it becomes a source of instability in the control loop that operates the switching mechanism for voltage regulation within the internal operation of the supply (say, for a switching pre-regulator ahead of a final linear series pass regulator). We should like to actually increase the amount of leakage inductance in the power transformer for a high current power supply (in this case, a high performance bench power supply—but it might be for any power supply) to assist in limiting inrush currents and provide filtering, but are faced with an uncooperative conventional control loop architecture, such as the one shown in FIG. 1.

Figure 1A:
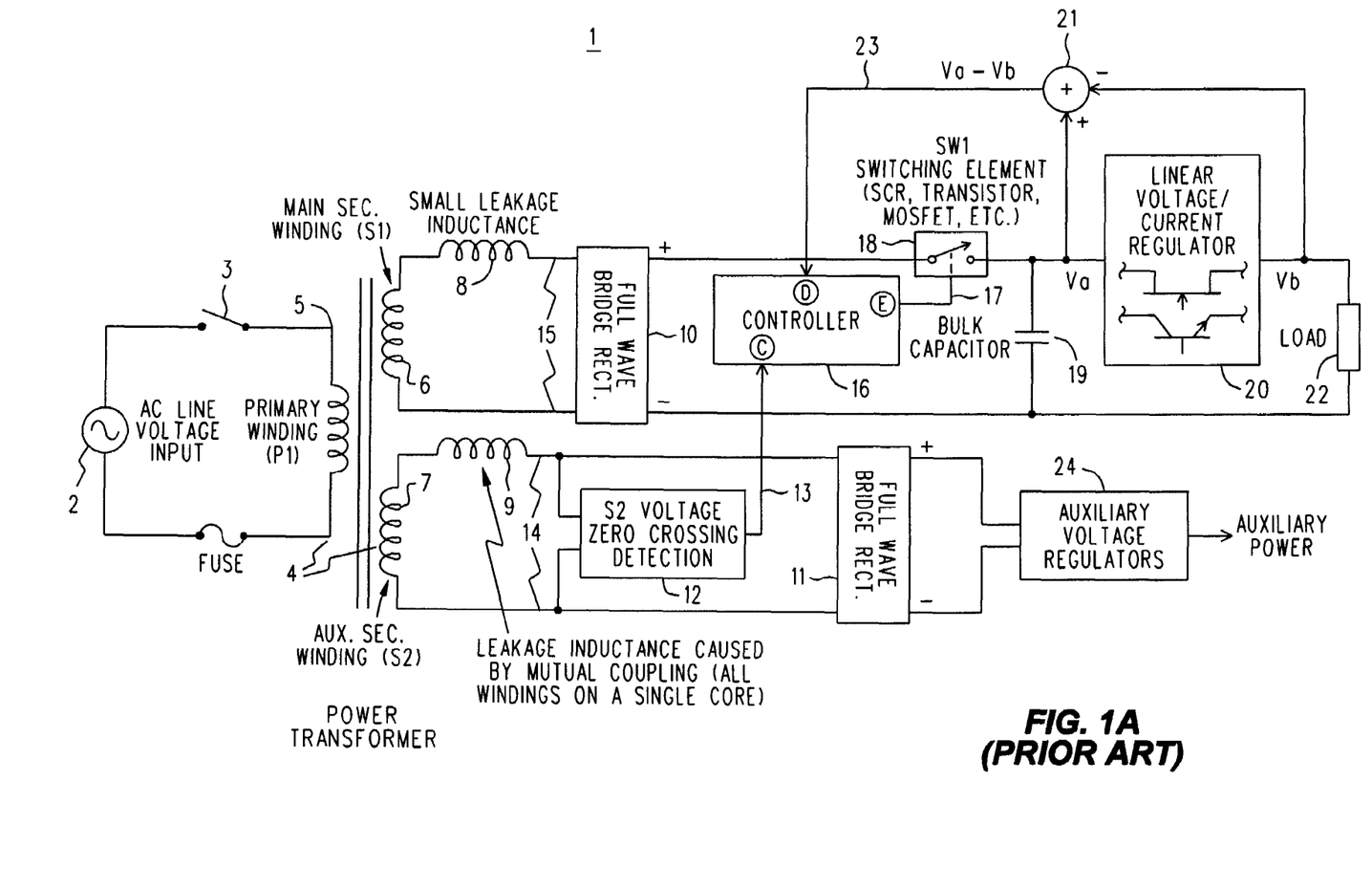
FIG. 1A is a simplified block diagram of a prior art technique for a power supply that uses a switching pre-regulator.

Briefly, FIG. 1A shows a switching power supply 1 wherein an AC source ('the line voltage') 2 is coupled through a suitable switching arrangement 3 and fusing arrangement to the primary winding 5 of a power transformer 4. A main secondary winding 6 supplies the main power provided by the power supply 1 to a load 22. In pursuit of this, a full wave bridge rectifier 10 creates from the main secondary's voltage 15 a full wave rectified voltage that is applied to a bulk filter capacitor 19 (which is a rather large value of capacitance) through a switching mechanism 18. The purpose of the switching mechanism 18 is to provide only the amount of charge to the bulk filter capacitor needed to allow a linear voltage/current regulator 20 to operate properly, while also limiting the amount of power that is dissipated by that voltage/current regulator (which may be a series pass arrangement). The idea is that, for light loads and/or lower output voltages the bulk capacitor might need a lesser charge, and the lower voltage associated with that reduces power dissipation. Regulation is obtained by monitoring (21) the voltage drop $V_a$-$V_b$ (23) across the linear regulator 20 (which we assume knows what the output voltage is to be, and have not shown its internal process to maintain it . . . ) and applying that voltage drop 23 to a controller 16 that also receives zero crossing information 13. The controller 16 creates a switch control signal 17 that causes the switching operation of the switching element 18, which might be a transistor (either a FET [Field Effect Transistor] or perhaps bi-polar transistor). It will be noted that the main secondary winding 6 is shown as exhibiting a desired intrinsic, or leakage, inductance 8. This is there on purpose to assist in limiting inrush current and provide some (slight) filtering.

An auxiliary secondary winding 7 is used to provide other auxiliary voltages, which may include 'housekeeping' voltages that are used in the operation of the main power supply circuitry for the main secondary winding (6). To this end, a full wave bridge 11 provides from the auxiliary secondary's voltage 14 a full wave rectified voltage that is used in two ways. First, it supplies a rectified voltage to the auxiliary voltage regulator circuitry 24; and second, it feeds into a zero crossing detector 12 whose output 13 is applied to controller 16. We have two things to note about this arrangement.

First, secondary winding 7 also exhibits a leakage inductance 9 that, to a certain degree, will mimic that of leakage inductance 8 in the main secondary winding. This is an attempt to provide zero crossing information that matches what is actually happening for the secondary 6. Unfortunately, it will only be an approximation, because of the untidy nature of leakage inductance 8, and the fact that the current in the two windings 6 and 7 do not react to their respective leakage inductances 8 and 9 in identical ways. Second, the full wave rectified waveform applied to the zero crossing detector 12 is not an agreeable one where there is a zero crossing every 180° of the applied source from the mains. We are not saying its frequency has changed, but rather that alternate ones of the zero crossings (every other zero crossing of the full wave rectified signal) has shifted to later in time by as much as 30° of the entire 360° of the complete AC input sine wave. This shift in every other zero crossing location is cause by the leakage inductance 8 in conjunction with non sinusoidal current wavefroms, and owing to mutual coupling within the power transformer also manifests itself to a significant degree in the auxiliary secondary winding 7. This 'staggered' zero crossing situation complicates the task that the zero crossing detector 12 must perform (we shall see that it job is to make a constant amplitude ramp in phase with the zero crossings).

Figure 1B:
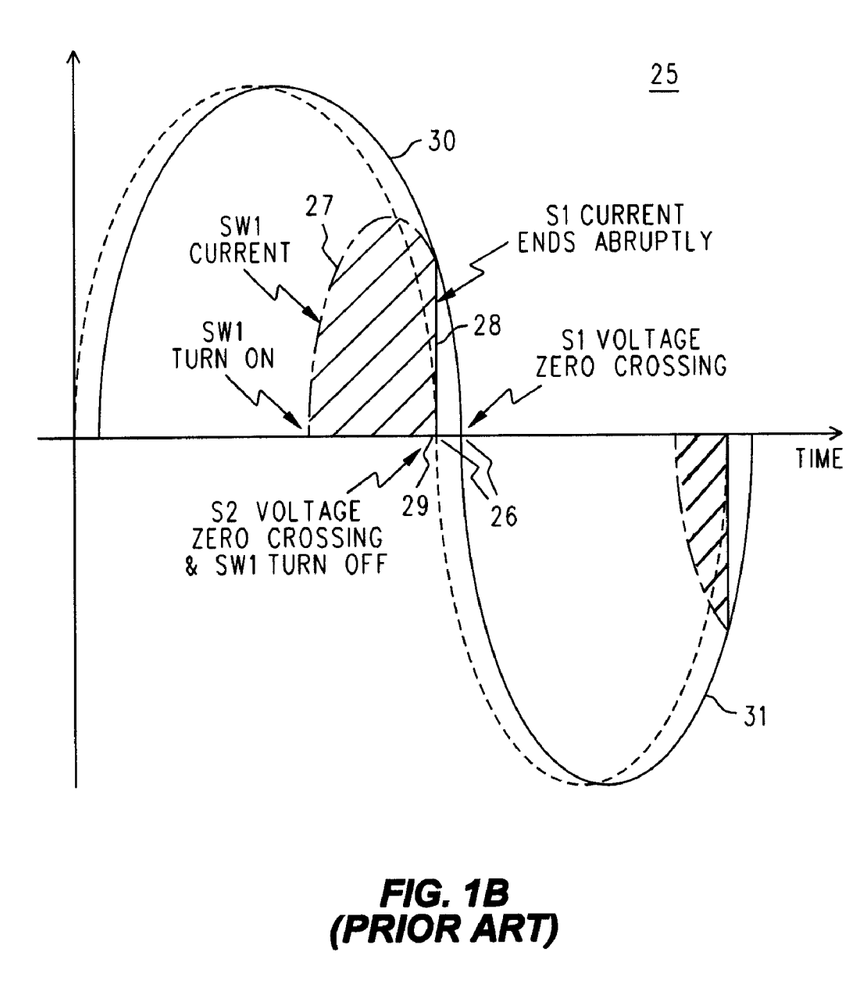
FIG. 1B is a simplified waveform diagram illustrating certain phase relationships between some voltages and currents in the technique of FIG. 1A.

A further disadvantage of the technique of FIG. 1A is shown in FIG. 1B, to which we now turn. Waveform diagram 25 in FIG. 1B shows some voltage and current relationships of interest in appreciating the operation of the circuit of FIG. 1A. In particular, note the phase shift 26 between auxiliary secondary (7) S2 and the main secondary (6) S1, and the generally asymmetrical nature of the zero crossings and their respective half cycles 30 and 31. Note the S1 current waveform (which primarily charges capacitor 19) has an abrupt trailing edge 28 that aligns with the S2 zero crossing 29. This is the occasion for acoustic noise from the power transformer and other aggravations (e.g., unwelcome electrical noise in the surrounding circuits that is of a significant amount).

We should like to keep the general outline of the switching pre-regulator (18) and final regulator (20) technique of FIG. 1A, but fix its assorted problems in a way that accommodates a larger than usual amount of leakage inductance 8 for use with relatively high currents, reduces acoustic and electrical noise from the power transformer when under load, and avoids instability in the pre-regulator's control loop arising from the control signal 13 exhibiting artifacts arising from the asymmetrical half-cycles (30, 31) from secondary winding S2 and its rectifier. What to do?

Simplified Description

A switching pre-regulator for a bulk capacitor filter followed by a series pass regulator has a switching element controller that relies upon a large desirable leakage inductance in a main secondary winding of a power transformer acting as a swinging choke input to the bulk capacitive filter. This desirable leakage inductance limits inrush current and supplies some filtering. However, the effective value of the swinging choke is a function of load conditions, and introduces a varying phase shift that would potentially disturb the zero crossing detection used in properly activating the switching element. In addition to creating a reference ramp synchronized to the phase shifted, twice power line frequency, full wave rectified zero crossings of the principal current supplying secondary winding, the switching element controller receives a selectable one of an isolated indication of primary line voltage zero crossings or zero crossing indications for an un-rectified auxiliary secondary winding that has a separate leakage inductance that mimics the effect of the phase shift experienced with the main secondary winding. This gives the switching controller the ability to know true zero crossings. The controller for the switching element can now adjust the conduction of that switching element to turn off at a zero crossing, which reduces both acoustic noise from the power transformer and in-circuit electrical noise by eliminating a steep falling edge in the switched current pulse used to supply the bulk capacitive filter.

DETAILED DESCRIPTION

Figure 2:
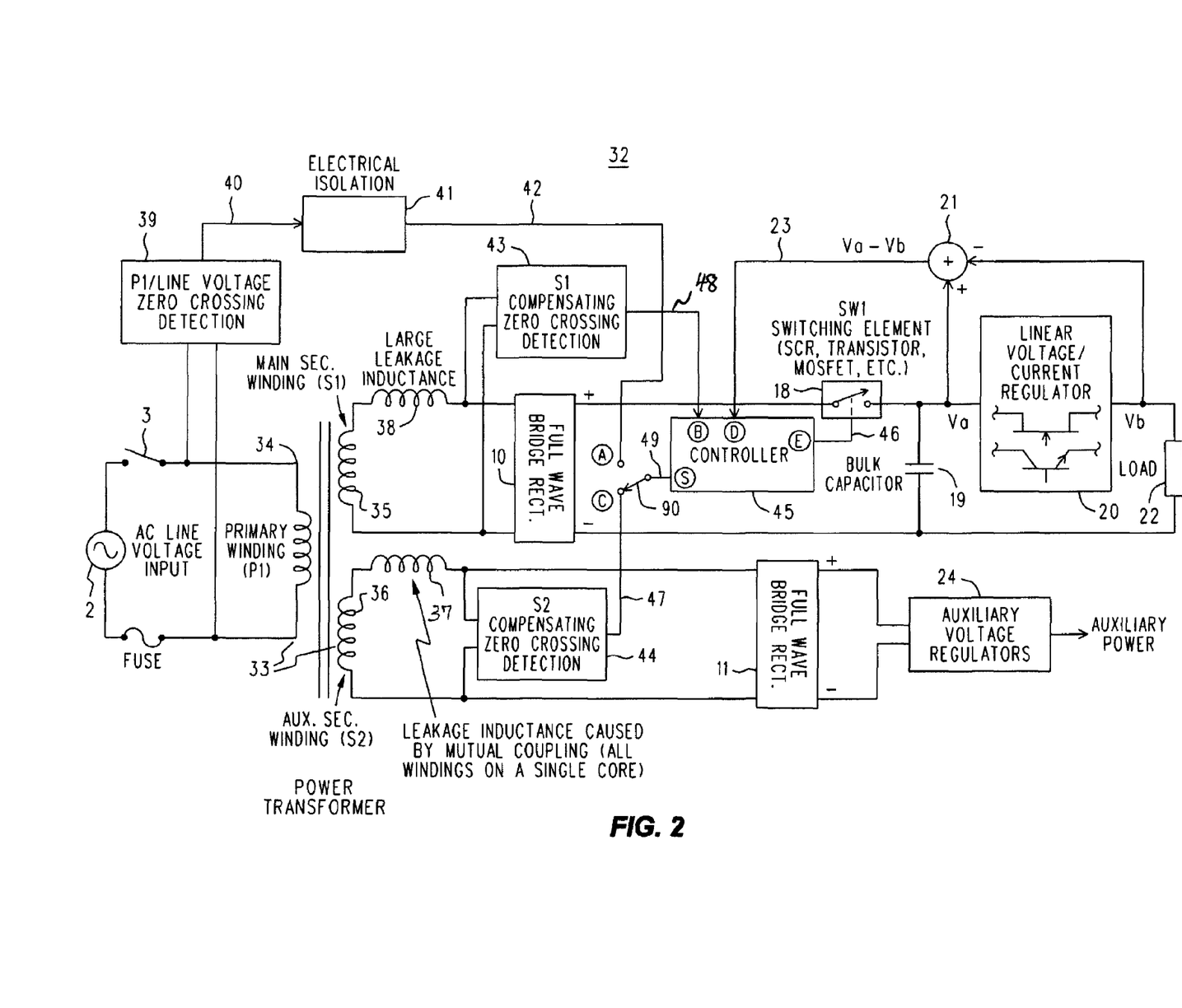
FIG. 2 is a simplified block diagram of a technique similar to that of FIG. 1A but that allows a larger leakage inductance in the power transformer to limit inrush current and reduce acoustic and electrical noise.

Refer now to FIG. 2, wherein is shown a simplified block diagram 32 of a power supply having a switching pre-regulator whose operation tolerates an increased amount of leakage inductance (38) in the power transformer. This block diagram is similar in various respects to that of FIG. 1A, and to that extent reference numerals referring to similar items remain unchanged, and will not be further described.

A principal difference is that this power supply may be intended for one involving higher currents than for an arrangement such as shown in FIG. 1A, and power transformer 33 maybe different in that it can supply a higher current. Power transformer 33 has a primary winding 34 (for brevity we have not shown the usual series/parallel trick that allows operation on 110/220 VAC), a main secondary winding 35 and an auxiliary secondary winding (sometimes called a tertiary winding) 36. There might well be other windings, especially in the case where the power supply is a built-in supply for a complex instrument that needs many different voltages. Aside from that, there is a leakage inductance 37 associated with auxiliary secondary winding 36, and a desired leakage inductance 38 associated with main secondary winding 35. Leakage inductance 38 is preferably larger than typically used.

A compensating zero crossing detector 44 is coupled to the auxiliary secondary winding, just as a conventional zero crossing detector 12 was in FIG. 1A. We prefer that in this instance zero crossing detector 44 be of the compensating sort (91) shown and described in connection with FIG. 5. The output 47 ("C") of zero crossing detector 44 is made potentially available through a switch 90 as the "S" input to a controller 45 whose output 46 controls the switching element S1 (18).

Another compensating zero crossing detector 43 is connected across the un-rectified output of the main secondary winding 35. We also prefer that zero crossing detector 43 be of the compensating sort (91) shown and described in connection with FIG. 5. Its output 48 is the "B" input to the controller 45.

As before, the "D" input to the controller 45 is the voltage drop Va-Vb (23) across the liner voltage/current regulator element 20, which may be a series pass arrangement whose internal operation is not shown for the sake of brevity.

Lastly, a zero crossing detector 39 is shown as coupled across the AC input voltage applied to the primary winding 34. It output 40 is electrically isolated by circuit 41 (which may be an optical device, or perhaps a pulse transformer) and its (now isolated from the AC line) output 42 is an input "A" that is also made potentially available through switch 90 as the "S" input to the controller 45. Zero crossing detector 39 may be a conventional sort of zero crossing detector, as the trouble that such a conventional circuit could otherwise cause (if the AC mains 2 are not of a low enough source impedance to show no appreciable change in waveform/zero crossings regardless of any peculiar recurrent current waveforms in the secondary windings of the power transformer 33) will be 'fixed' in due course. Such immunity to pollution of the AC mains (by load 22) might often be expected to be the case, although not necessarily always. (Suppose the load is a particularly nasty one and the source 2 is an engine driven generator of modest capability, or is an inverter, or that there is significant inductance in the power distribution arrangement connecting the source 2 to the power transformer 33.)

Before proceeding, it will be appreciated that both zero crossing detectors (and their outputs) 39/40/41 and 44/47 need not be present in any actual implementation, although they might be if truly selectable operation in the field is desirable. It follows that switch 90 won't be present unless both zero crossing detectors are. At least one of those two zero crossing detectors (39, 44) needs to be there, and if there is but one then switch 90 is replaced with a constant connection between input "S" and the output of whichever one of zero crossing detectors 39 and 44 is present. We shall have more to say about the significance of which of outputs "A" and "C" is applied as input "S" after the discussion for FIGS. 3 and 4.

Figure 3:
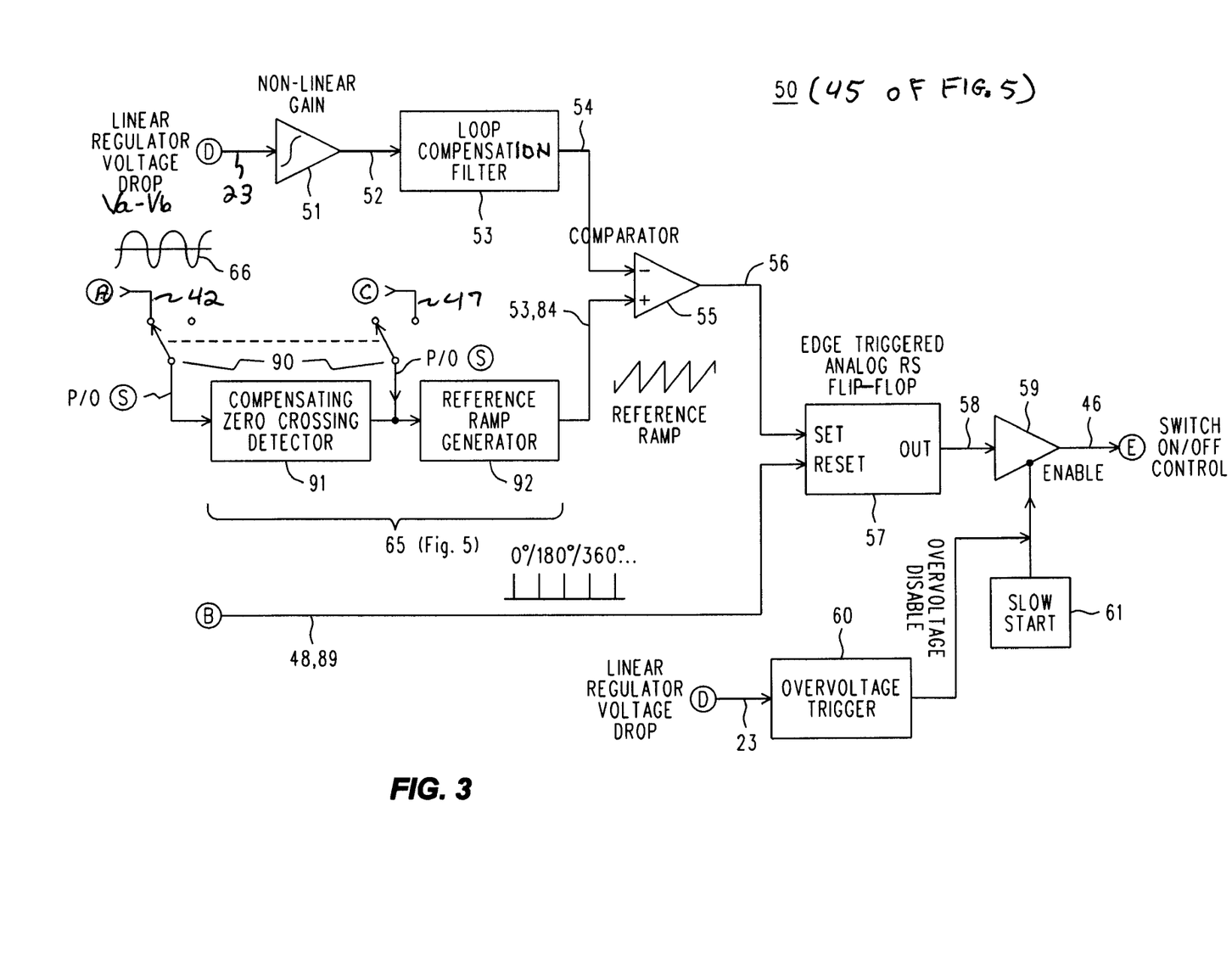
FIG. 3 is a simplified block diagram of a switching element controller for use with the block diagram of FIG. 2.

Turning now to FIG. 3, note that it is a block diagram 50 of the controller 45 of FIG. 2. Let us begin with what happens to the detected voltage drop 23 across the linear regulator element 20. It is first amplified by a non-linear gain stage 51 to compensate for the non linear relationship between phase angle (for SW1 (18)) and the power consumed by a load when switching a segment of a sinusoid into the bulk filter capacitance 19. Output 52 of the non-linear gain stage 51 is coupled to loop compensation filter 53 to establish the control dynamics for the voltage pre-regulation control loop and prevent oscillations. Filtered output (54) is applied to the (−) input of a comparator 55 whose output (56) will (eventually) control (via SW1 (18)) the onset and phase duration of the conduction portion of S1 current waveform 63 in FIG. 4. To appreciate that, we need to see where the (+) input (53, 84) comes from, and what it represents.

The (+) input to the comparator 55 is responsive to a ramp waveform (53, 84) that is generated by a compensating zero crossing detector and reference ramp generator 65 (the whole of FIG. 5: 91 & 92) that is driven by the selected (by switch 90 in FIG. 2) source: either signal 42 "A" from across the primary winding 33 or from signal 47 "C" from across auxiliary secondary winding 36. There are some minor differences as to why one might be preferred over the other in a given situation, but for now those can be ignored in favor of appreciating how the overall loop operates.

The reference ramp (53, 84) will be of constant amplitude and of twice the power line frequency. Each 'sawtooth' segment of the reference ramp will be the same as its predecessor and its successor, unless the frequency of the applied AC 2 is actually varying. That is, not even a moderate amount of asymmetry in the alternate zero crossings applied to its input "S" 47 will disturb the symmetry of the consecutive sawtooth segments of the ramp. Why this is so will be explained in connection with FIG. 5.

Figure 4:
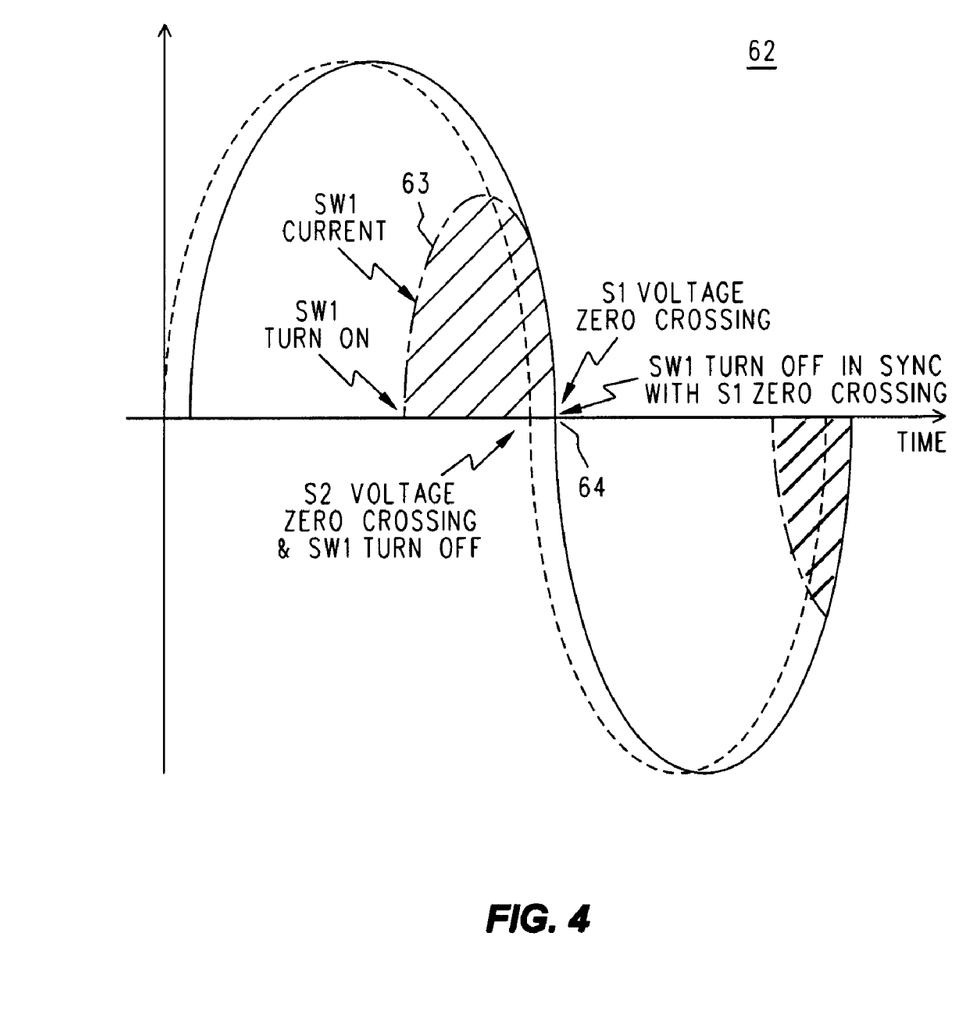
FIG. 4 is a simplified waveform diagram illustrating certain phase relationships between some voltages and currents in the technique of FIG. 3, and which are different than those of FIG. 1B.

The constant amplitude reference ramp is a linear representation of the 0° to 180° to 360° to 540° precession of phase for the compensated (ideal!) zero crossings of the selected reference voltage. As such, if more power is needed to keep filter capacitor 19 sufficiently charged, we want to close SW1 at a lower location on the reference ramp than we would for a situation where less power was needed. So what we need from comparator 55 is a decision as to when the ramp is above and when it is below, such a location. The job of the non-linear gain stage 51 is to provide just such an adjusted level to compare to, and after it is filtered (53) it (54) is applied to the (−) input of the comparator 55. The output 56 of the comparator is now the basis of controlling SW1. What is left to do is to reference that basis to the appropriate zero crossing ahead of when SW1 would be turned on to charge filter capacitor 19. That zero crossing is (in this example) the positive going zero crossing from main secondary winding 35, as is shown in FIG. 4. The (+) and (−) comparator inputs being connected as shown brings this into effect. Now all that remains is to get the S1 current (63 in FIG. 4) through SW1 gracefully turned off (for acoustic and electrical noise reduction) at the negative going zero crossing (64) of the main secondary Si (35). To bring these turn on and turn off indications into a single signal: (1) The turn on indication (56) from comparator 55 is coupled to the set input of an edge triggered set/reset flip-flop 57 whose output 58 is (almost!) the control signal 46 used to operate SW1 (18); and (2) The reset input of flip-flop 57 is coupled to the signal "B" (48, 89) that is produced by the zero crossing detector 43 of FIG. 2 (which will in due course be seen as an instance of the circuit 91 of FIG. 5).

The output 58 of flip-flop 57 is conditioned by a buffer circuit 59 that is responsive to an enable input. When fully enabled the buffer 59 reproduces signal 58 in its entirety, allowing normal operation. Buffer 59 can be totally disabled by a shunting of the enable signal by an over-voltage trigger circuit 60 when the voltage drop 23 across the linear regulator element 20 exceeds safe limits. Such total disablement will cause SW1 to remain open, and thus starve the output for power with the intent of saving it (and perhaps the load 22, too) from some nasty fate. There is an intermediate condition of the enable signal produced by a slow start circuit 61 that allows the initial onset of SW1's operation to begin gradually, as a further protection against inrush currents and a large initial slewing of loop dynamics as power is applied.

With what has been mentioned above, the waveform 62 of FIG. 4 is believed to speak for itself, especially if one compares it to that of FIG. 1B.

Figure 5:
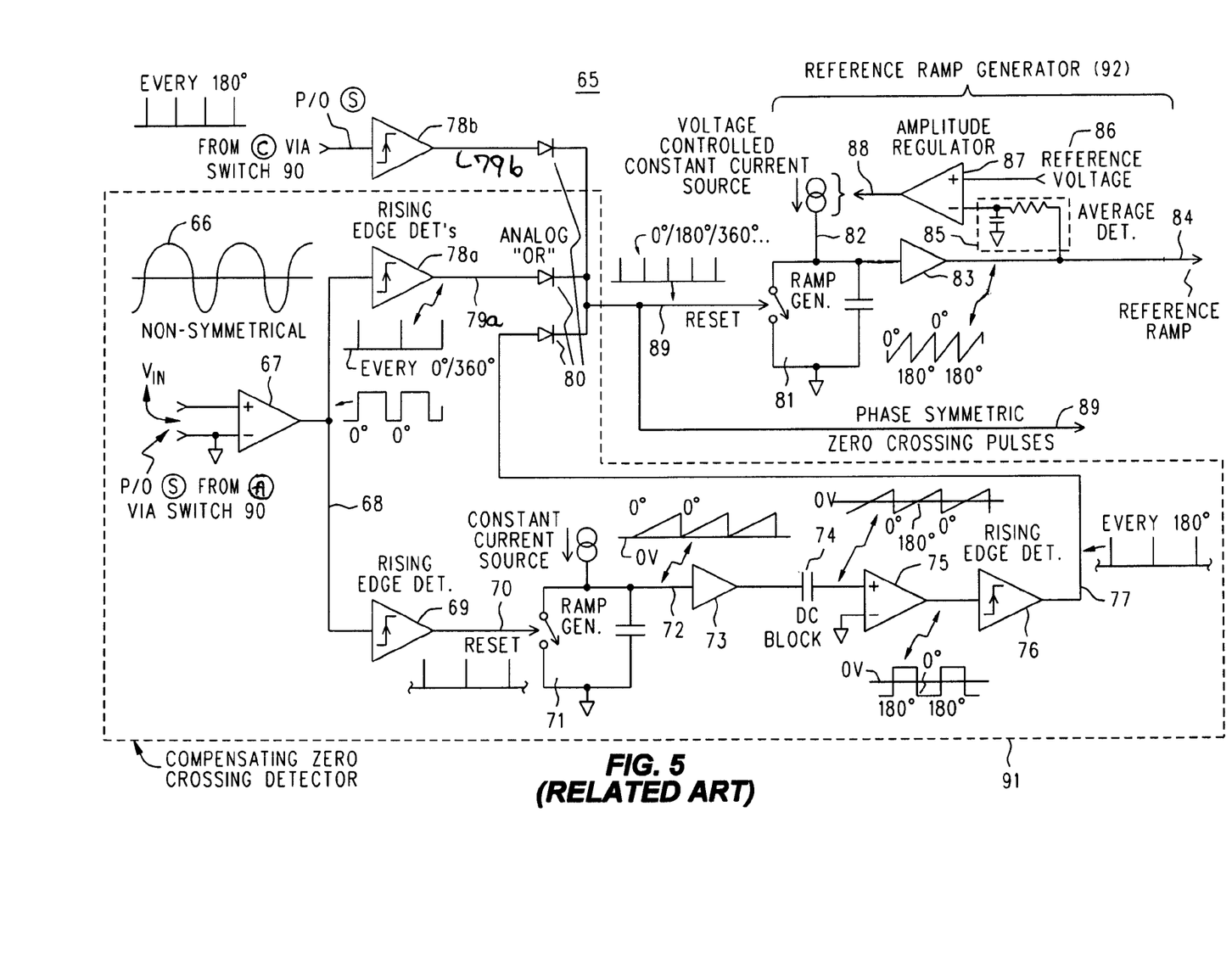
FIG. 5 is a simplified block diagram of a zero crossing detector that may be used as the zero crossing detection mechanisms of FIG. 3 to alleviate the de-stabilizing effects upon the pre-regulator's controller of unsymmetrical half-cycles from full wave bridge rectifiers under non-sinusoidal current loads.

Refer now to FIG. 5, wherein is shown a simplified block diagram 65 of circuitry that produces, from a semi-sinusoidal AC input voltage $V_{IN}$ 66 having non-symmetrical half-cycles, a sawtooth ramp voltage of twice the frequency of $V_{IN}$, of constant amplitude and whose individual ramp sections are of equal duration. To accomplish this, block diagram 65 is divided into two sections: a compensating zero crossing detector portion 91 and a reference ramp generator portion 92. We show them together, as they are intended to function is a sequential manner, as indicated. Despite that, their portions might occur in different locations, and there may be multiple instances of the compensating zero crossing detector portion 91 (e.g., at 43 and at 44).

As an aside, the following explanation is adapted from a similar one that appears in a US patent application entitled ZERO CROSSING DETECTION AND CORRECTION UPON A DISTORTED PRIMARY AC POWER LINE VOLTAGE, Ser. No. 11/551,953, filed 23 Oct. 2006 and assigned to Agilent Technologies, Inc. We include it here (in slightly modified form) as a convenience to the reader, and because of foreign filing considerations that are often hostile to the US practice of incorporation by reference.

To begin this explanation, some $V_{IN}$ (66) representing AC input 2 is applied to a comparator 67 whose output 68 is a square wave whose asymmetry matches that of $V_{IN}$. We arbitrarily pick the positive going rising edge of waveform 68 as the 0° location on $V_{IN}$. A rising edge detector 69 is coupled to signal 68 and produces a series of narrow pulses at an output 70 that are coincident with the rising edges of signal 68, and thus with the 0° locations of $V_{IN}$. The narrow pulses of signal output 70 reset a ramp generator 71, which may be formed by a constant current source that charges a fixed capacitor. The charging creates a ramp (72). A switch (e.g., a FET) resets the ramp by shorting out the capacitor for the duration of the narrow reset pulse, draining it of its charge. One end of the capacitor is grounded, so when the switch is open the ramp voltage starts from zero volts. The ramp may be buffered by an amplifier 73, and its output is applied through a DC blocking capacitor 74 to the (+) input of a comparator 75 whose (−) input is grounded.

By removing the DC component of the uni-polar and referenced to ground waveform 72 the signal applied to the (+) input of the comparator 75 is balanced about ground, in that half of it will be above ground (+) and half below ground (−). Since the ramp is a linear change in voltage between two extremes that are each equidistant away from ground, the location in time when the comparator 75 changes the polarity of its output (it is being used as a squaring/clipping circuit, as was comparator 67) is at the midpoint between the start and end of the ramp sections. Since the start/end of the ramp corresponds to 0°/360°, the midpoint between them must correspond to 180°. Because of the grounded (+) input for comparator 75 the rising edge of that comparator's output, which is detected by rising edge detector 76 and indicated by its output 77, represents 180°.

When input "S" is taken from "A", an asymmetrical square wave signal 68 is also applied to a rising edge detector 78a whose output 79a is a narrow sequence of pulses representing every 0°/360°. A corresponding sequence of pulses 79b is produced by 78b when input "S" is taken from "C". One of these sequences (79a or 79b) is "OR'ed" together with the every 180° signal 77 by an analog OR gate 80. (The diodes shown are an effective way to do this, but there are other ways, as well.) The merging of the two pulse streams (77 with one of 79a or 79b) creates one pulse stream (89) that has a narrow positive pulse for every half cycle of $V_{IN}$, whose frequency is thus twice that of $V_{IN}$, and which are (given no frequency change to $V_{IN}$) equally spaced in time. What we need to do now is trade this pulse stream for a corresponding sawtooth ramp (84) of constant amplitude.

This is accomplished by applying the pulse stream 89 to another ramp generator 81 similar to 71, save that its constant current source 82 is voltage controlled. The ramp produced is buffered by amplifier 87, whose output 88 is the desired "REFERENCE RAMP" that can be used as the compensated zero crossing indications needed by the switching mechanism 20 of FIG. 2. The amplitude of this signal 84 is determined by the current rate in use by the constant current source 88. That rate is in turn determined by an amplitude regulator formed by a differential amplifier 87 whose output 88 controls the rate, as the average of signal 84 is compared to a selected reference voltage 86 (i.e., it is a little feedback loop). The average value of signal 84 may be obtained from a suitable filter 85.

Finally, here are some considerations that relate to selecting which of inputs "A" and "C" should be used as "S". If "A" is supplied and used, the zero crossing detector 39 can be pretty simple—just a 'squaring up' operation such as 67 in FIG. 5 would do. Also the electrical isolation 40 could then be a simple optical transmit-receive for a square wave. By coupling "A" to an instance of circuit 91 it won't matter if the zero crossings at winding 33 bothered by the load 22, or not, since circuit 91 is a compensating zero crossing detector. (There is an alternate arrangement that is not shown, where the zero crossings at winding 33 are assumed to be symmetrical despite the load 22. In that case the zero crossing detector 39 needs to produce narrow pulses, and can be connected to a "B-style" input of circuit 92 instead of to circuit 91.) Also, if "A" is in use the possibility arises that there is no reason to believe that the frequency of the applied line voltage will vary appreciably. Such an assumption can remove the need for a constant amplitude regulation mechanism for the reference ramp, although one might wonder about the ultimate wisdom of such a assumption for equipment to be used later in an environment that is not under one's own control . . . . We confess that we prefer the constant amplitude reference generator 91.

By taking "C" to be "S" the possibility that "C" is polluted by behavior of the load (22) is admitted, but is rendered harmless by the use of the compensating zero crossing detector 91. Also, the constant amplitude reference ramp generator 92 that goes with it eliminates any worries about allowing permissible amounts of change in the frequency of the supply voltage (2) applied to the power transformer 33.

We claim:

1. A method of regulating the output of a power supply having a switching pre-regulator operated from a rectified secondary winding voltage produced by a power transformer having an amount of leakage inductance sufficient to limit inrush current, the method comprising the steps of:
   (a) detecting in the secondary winding voltage zero crossings occurring unequal amounts of time apart by an amount related to the amount of current being supplied by the secondary winding;
   (b) adjusting an indication of the zero crossings detected in step (a) to have equal periods of time between successive indications of zero crossings while retaining the same frequency as the secondary winding voltage;
   (c) detecting in a different winding of the power transformer voltage zero crossings occurring unequal amounts of time apart by an amount related to the amount of current being supplied by the secondary winding;
   (d) adjusting the an indication of the zero crossings detected in step (c) to have equal periods of time between successive indications of zero crossings while retaining the same frequency as the voltage of the different winding;
   (e) amplifying the voltage drop across a series regulation element whose input is supplied by a filter capacitor and whose regulated output voltage is applied to a load, the amplification having a transfer function that describes as a comparison voltage a location in phase when to begin charging the filter capacitor from a rectified half-cycle of a sinusoid voltage from the secondary winding to keep the voltage drop approximately constant;
   (f) creating a reference ramp waveform of constant amplitude representing with each cycle thereof the duration in phase of a rectified half cycle of the secondary winding voltage, and having one such cycle for each adjusted indication of step (d);
   (g) comparing the comparison voltage of step (e) with the reference ramp of step (f);
   (h) connecting the rectified secondary voltage to the filter capacitor upon a selected comparison in step (g); and
   (i) subsequent to step (h), disconnecting the rectified secondary voltage from the filter capacitor upon the occurrence of an adjusted zero crossing indication of step (b).

2. A method as in claim 1 further comprising the steps of filtering the comparison voltage to establish control loop dynamics prior to its use in step (g).

3. A method as in claim 1 wherein the different winding is a tertiary winding.

4. A method as in claim 1 wherein the different winding is a primary winding.

* * * * *